April 29, 1952 — H. L. FINLEY — 2,594,412
IGNITER FOR OIL BURNERS
Filed Jan. 29, 1946

INVENTOR.
Harold L. Finley.
BY Blair, Curtis & Hayward

Patented Apr. 29, 1952

2,594,412

UNITED STATES PATENT OFFICE 2,594,412

IGNITER FOR OIL BURNERS

Harold L. Finley, Woodhaven, N. Y., assignor, by mesne assignments, to General Bronze Corporation, Garden City, N. Y., a corporation of New York Application January 29, 1946, Serial No. 644,108

6 Claims. (Cl. 175—115)

1

This invention relates to oil burners and particularly to the vaporization and ignition of the oil in a thermal vaporizing bowl.

An object of the invention resides in the provision of an igniter that will function to ignite the fuel oil irrespective of the volume of oil in the vaporizing bowl.

A further object of the invention resides in so constructing the igniter that oil will be presented to an ignition spark in such physical state that the oil may readily be ignited to initiate vaporization and burning above the surface of any oil that may have accumulated in the bowl.

A further object of the invention resides in so constructing the igniter that an ignition spark automatically will be created adjacent to, but above, the surface of the oil within the vaporizing bowl regardless of its depth.

With these and other objects in view, which will appear as the description of this invention progresses, the invention resides in the combination and arrangement of the parts described in this specification, illustrated in the drawings and recited in the claims.

In the drawings, which illustrate a preferred embodiment of my invention:

Figure 1:
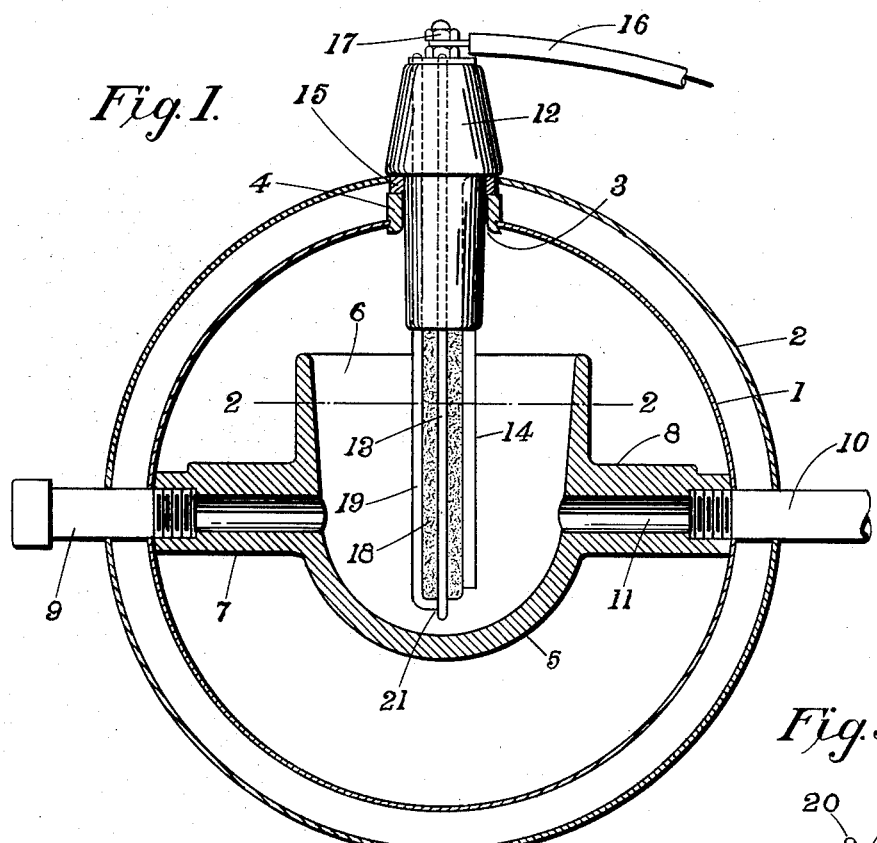
Figure 1 is a sectional view, partly in elevation, illustrating the igniter and its use in a vaporizing bowl type of burner.
Figure 3:
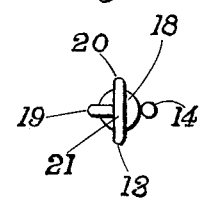
Figure 3 is a detail view looking at one end of the igniter.

It has been common practice in the art, in the use of the bowl type of oil burner, to insert a burner igniter, such as a taper, through an opening in the burner casing into the vaporizing bowl in order to raise the oil to a vaporizing temperature and to ignite the oil in the bowl. As the quantity of the oil in the bowl increases the length of time of application of the heat increases, with the result that, if for any reason the volume of oil is extraordinarily large, the amount of time required to bring the temperature of the oil to an ignition point and to ignite the oil is objectionably long. After the ignition occurs the burning igniter or taper is withdrawn from the bowl and burner casing and reinserted when it becomes necessary to again ignite the oil.

In the present invention the igniter is constructed and arranged to remain in position

2 within the bowl and burner casing so that it may function to raise the oil to a vaporization temperature, to ignite the oil and to again pass through this cycle of operations should it again become necessary to raise the temperature of the oil to its vaporization point and to ignite the oil thereafter.

In the drawings I have illustrated, conventionally, a burner casing which includes an inner shell 1 and a spaced outer shell 2. Such a casing, as shown in the United States Letters Patent to Perry, No. 2,391,069, dated December 18, 1945, for example, is provided with an opening 3 for the insertion of the igniter or taper, which opening is provided with a sealing ring 4 for the reception of a plug (not shown) which is applied after the oil has been ignited and the igniting taper withdrawn.

The burner also includes a vaporizing bowl 5 which is open at the top at 6 and is suitably supported within the burner chamber.

In the form shown this bowl is provided with outwardly extending projections 7 and 8, one of which is supported in the casing by suitable means such as a stud 9 and the other of which is similarly supported but by a fuel supply conduit 10 which discharges through an orifice 11 into the bowl itself.

This orifice 11 is usually located somewhat above the bottom of the bowl and spaced from the top thereof. It has heretofore been the practice, when it is desired to initiate vaporization and combustion of the oil within the vaporizing bowl and burner chamber, to permit a small quantity of oil to flow into the bowl so that the ignition device or taper may, as quickly as possible, raise the temperature of the oil and of the bowl to the vaporization temperature of the oil. Should vaporization and ignition of the oil be delayed while the oil continues to flow into the bowl, the volume of oil in the bowl will increase and consequently the application of heat necessary to raise the oil to a vaporization temperature will be increased, principally because it will be necessary to raise the temperature of the entire body of oil to its vaporization temperature.

With my invention, however, the heat necessary to initiate combustion is not affected by the amount of oil within the bowl inasmuch as the initiation of combustion results from the application of heat to a small quantity of oil above the oil level in the bowl.

The invention includes an igniter which is constructed as follows: an insulator 12 is removably mounted in the sealing ring 4 and extends into the burner casing. A pair of electrodes 13 and 14 are carried by this insulator. One of the electrodes may be connected to the secondary of the transformer while the other of the electrodes may be grounded through the burner casing or structure to the opposing side of the secondary or by direct lead to the secondary.

For convenience of illustration I have shown the latter electrode as grounded through the burner casing. To accomplish this the electrode 14 is connected to a grounded ring 15 which is in turn grounded to the burner casing, as shown in dotted lines in Figure 1. Of course the other electrode 13 is insulated from the casing by the insulator 12 and is connected by a proper conductor 16 to the transformer secondary, this conductor being connected to the electrode 13 through suitable means such as a binding post 17. Arranged in close proximity to the electrodes 13 and 14, and substantially coextensive therewith, is a fuel elevator 18 which is preferably of porous, rough surfaced, low specific heat and heat resistant material, such, for example, as fire brick, which elevator is capable of raising oil as by capillarity of wick action.

In order to maintain the oil elevator 18 in its proper association with the heretofore referred to electrodes, I may employ these two electrodes as elements of an enclosing cage and the remainder of the cage may be formed by the elements 19 and 20, which are insulated from the burner casing and connected together at their lower ends and with the electrode 13 at 21. These elements 19 and 20 are also connected to the conductor 16 through the binding post 17 so that they act as an electrode along with, and of the same character as, electrode 13.

It will, of course, be understood from the foregoing that the portions of the electrode 13 with its associated elements 19 and 20 that are located within the insulator 12 are insulated from the portion of the electrode 14 that is located within said insulator.

As illustrated in the drawings the igniter is so positioned in the burner casing that its lower end terminates closely adjacent the inner surface of the bottom of the bowl for a purpose which will later appear.

Assuming that the bowl is free of oil and it is desired to ignite the burner, a sufficient amount of oil is permitted to enter the bowl through the supply conduit 10 to create an oil level in the bowl such that the lower end of the oil elevator will be in contact with the oil. When in such contact the oil elevator, because of its characteristics hereinbefore described, will raise a small amount of oil from the accumulated oil in the bottom of the bowl and will become saturated with oil.

It will be realized that the surface of the elevator will be covered with a thin film of oil. Moreover, as the elevator is possessed of a rough surface and is porous, as heretofore pointed out, the surface will contain many hills and dales, or, otherwise stated, peaks and hollows. These hills or peaks will be saturated with oil and will have a thin film on their surface and likewise the dales or hollows will have a thin surface film of oil. However, there necessarily will be spaces between the hills or peaks with the result that there will be small areas of oil which will be subjected to the ignition spark.

When the igniter is thrown into circuit a spark will jump between the electrodes 13, 19 or 20 on the one hand and the electrode 14 on the other and across and in contact with the face of the oil elevator. The result of this will be that the elevator and the dispersed oil in the elevator will be quickly raised to the vaporization and combustion temperature of the oil and combustion will occur. When the temperatures within the combustion space of the burner is raised to the combustion temperature of the oil, the igniter may be thrown out of circuit, preferably by an automatic control, inasmuch as, thereafter, the incoming oil will be raised to its combustion temperature by the ambient heat in the burner casing.

If for any reason the amount of oil in the bowl reaches such a high level, before combustion is initiated, that the raising of that amount of oil to its combustion temperature requires a considerable time of application of heat, the ignition of the oil in the elevator will not in any way be affected because, irrespective of the oil level, the elevator will always carry a relatively small amount of oil which will be exposed to the ignition spark in small areas.

Of course it will be understood that, even when the oil level is relatively high within the bowl, the combustion of the oil that is carried by the oil elevator will create a flame substantially throughout the exposed surface of the elevator, with the result that the temperature of the oil in the bowl at its surface will be quickly raised to a combustion temperature, which temperature will progress throughout the body of oil, thus raising the entire body of oil and the bowl to such a temperature.

Thus the igniter will serve to initiate combustion of the oil within the bowl, irrespective of the volume or depth of oil, and will serve to raise the temperature of the combustion space so the combustion of the oil, once initiated, will be maintained.

Figure 4:
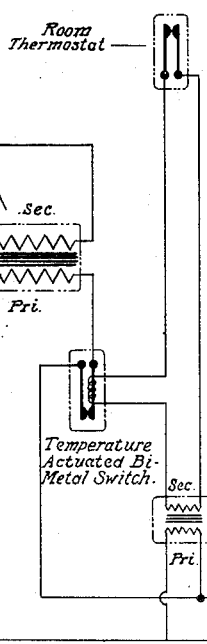
Figure 4 is a diagrammatic view illustrating one arrangement for creating a spark in the igniter.
Figure 2:
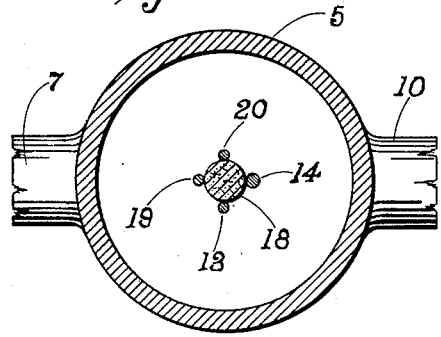
Figure 2 is a section on the line 2—2 of Figure 1.

In Figure 4 of the drawings I have illustrated one means in which the igniter may be operated, but it is to be understood that this is only for the purpose of illustration as it will be evident to those skilled in the art that other means may be employed. In this circuit the electrode 13 is connected to one side of the secondary of a step-up transformer, while the grounded electrode is connected to the other side of the secondary through the burner casing. The operation of the igniter is under the control of a room thermostat which in turn controls a temperature responsive switch, which switch is in series with the primary side of the step-up transformer. A step-down transformer in a parallel with the line is interpolated in the thermostat circuit.

It will be understood that when the room thermostatic switch closes, the "temperature actuated" switch will be closed in response so that, so long as the room switch is closed the "temperature actuated" switch will be closed, at which time ignition will be effectuated.

While I have illustrated and described a particular form of my invention this has only been for illustrative purposes and I therefore do not wish to be limited to the details of construction disclosed in this application except in so far as limitation is made necessary by the claims.

I claim:

1. In an oil burner igniter an insulator body, a plurality of elongated electrodes carried by and extending from said body in spaced relationship to each other to form a cage and a porous wick member mounted within said cage and longitudinally substantially coextensive with said electrodes, one of said electrodes including portions extending along the length of said porous wick member on opposite sides thereof and around an end thereof.

2. In an oil burner igniter an insulator body, a plurality of elongated electrodes carried by and extending from said body in spaced relationship to each other to form a cage and a porous wick member mounted within said cage and longitudinally substantially coextensive with said electrodes, one of said electrodes including portions extending along the length of said porous wick member on opposite sides thereof and around an end thereof, and the other of said electrodes being arranged between said portions and on opposite sides of said porous wick member.

3. In an igniter for oil burners an insulator body, a porous wick member extending from said insulator body, a plurality of electrodes extending from said insulator body in substantially parallel relationship to each other and surrounding and forming a supporting cage for said wick member.

4. In an igniter for oil burners an insulator body, a porous wick member extending from said insulator body, a plurality of electrodes extending from said insulator body in substantially parallel relationship to each other and surrounding and forming a supporting cage for said wick member, at least one of said electrodes extending over the end portion of said wick member.

5. In an igniter for oil burners an insulator body, a plurality of electrodes carried by said insulator body and extending therefrom in spaced side by side relationship to form a cage, and a porous wick member mounted within said cage and longitudinally substantially coextensive with said electrodes, certain of said electrodes including means for retaining said porous member within said cage.

6. In an igniter for oil burners an insulator body, a plurality of electrodes carried by said insulator body and extending therefrom in spaced side by side relationship to form a cage, and a porous wick member mounted within said cage and longitudinally substantially coextensive with said electrodes, certain of said electrodes including means for retaining said porous member within said cage, said means being comprised by at least one of said electrodes.

HAROLD L. FINLEY.

REFERENCES CITED

The following references are of record in the file of this patent:

UNITED STATES PATENTS

| Number | Name | Date |
|---|---|---|
| 453,618 | Brown | June 9, 1891 |
| 980,801 | Kraus | Jan. 3, 1911 |
| 1,110,611 | Brandon | Sept. 15, 1914 |
| 1,621,373 | McManaman | Mar. 15, 1924 |
| 1,888,695 | Powers | Nov. 22, 1932 |
| 2,052,514 | Kinsman | Aug. 25, 1936 |
| 2,174,818 | Brace | Oct. 3, 1939 |
| 2,194,081 | Bock | Mar. 19, 1940 |
| 2,391,069 | Perry | Dec. 18, 1945 |

FOREIGN PATENTS

| Number | Country | Date |
|---|---|---|
| 20,946 | France | Nov. 28, 1919 |
| | (Addition to No. 444,255) | |
| 106,889 | Switzerland | Jan. 26, 1924 |